US007007423B2

(12) United States Patent
Andersson et al.

(10) Patent No.: US 7,007,423 B2
(45) Date of Patent: Mar. 7, 2006

(54) ADHESIVE LABEL RESEALABLE PACKAGE AND LABEL WEB

(75) Inventors: Thomas Andersson, Mörarp (SE); Carl-Olof Norlin, Strövelstorp (SE)

(73) Assignee: Regath HB, Helsingborg (SE)

( * ) Notice: Subject to any disclaimer, the term of this patent is extended or adjusted under 35 U.S.C. 154(b) by 0 days.

(21) Appl. No.: 10/499,979

(22) PCT Filed: Dec. 23, 2002

(86) PCT No.: PCT/SE02/02438

§ 371 (c)(1), (2), (4) Date: Aug. 3, 2004

(87) PCT Pub. No.: WO03/059776

PCT Pub. Date: Jul. 24, 2003

(65) Prior Publication Data

US 2005/0029128 A1 Feb. 10, 2005

(30) Foreign Application Priority Data

Dec. 27, 2001 (SE) .................................... 0104399

(51) Int. Cl.

| | |
|---|---|
| *G09F 3/10* | (2006.01) |
| *A45C 13/18* | (2006.01) |
| *B29D 15/00* | (2006.01) |

(52) U.S. Cl. ............................ 40/674; 40/638; 283/81; 383/5; 206/1.5

(58) Field of Classification Search ................ 206/440, 206/494, 812, 1.5, 247, 264; 383/66, 210, 383/211, 5; 428/40.1, 42.1; 40/638, 674; 283/81

See application file for complete search history.

(56) References Cited

U.S. PATENT DOCUMENTS 4,874,096 A 10/1989 Tessera-Chiesa (Continued)

FOREIGN PATENT DOCUMENTS

| | | |
|---|---|---|
| DE | 8708274.8 U1 | 9/1987 |
| DE | 42 41 423 A1 | 6/1994 |
| EP | 0396967 B1 | 11/1990 |
| SE | 463666 B | 1/1991 |

(Continued)

OTHER PUBLICATIONS

US 5,699,911, 12/1997, Joseph et al. (withdrawn)

*Primary Examiner*—Mickey Yu
*Assistant Examiner*—J. Gregory Pickett
(74) *Attorney, Agent, or Firm*—Birch, Stewart, Kolasch & Birch, LLP

(57) ABSTRACT

The invention relates to an adhesive label, a resealable package provide with such a label and a label web. The package has an openable flap (14) defined by an arcuate indication (16). The label (12) is adhesively fixed to the package body for the purpose of resealably sealing the flap. The label has a top portion forming a gripping tab (20) and two leg portions (22) extending in a diverging manner from the gripping tab (20) and defining between them a central recess (23). The label is integrated with at least one projecting indicator portion (24) for each leg portion (22), which indicator portions are adapted to be separated from the label (12) when the package (10) is opened for the first time. The leg portions with the projecting indicator portions (24) form a first contour on the convex side of the indication (16) and the leg portions (22) form a second contour on the concave side of the indication (16), which is complementary to the first contour. The web comprises a carrier for labels arranged in such a manner that a first contour of a label is fitted in and partially enclosed by a second contour of an adjoining label.

11 Claims, 3 Drawing Sheets

U.S. PATENT DOCUMENTS

| | | | | |
|---|---|---|---|---|
| 5,738,381 | A * | 4/1998 | Treleaven et al. | 283/81 |
| 6,015,045 | A * | 1/2000 | Joseph et al. | 206/494 |
| 6,309,105 | B1 * | 10/2001 | Palumbo | 383/211 |

FOREIGN PATENT DOCUMENTS

| | | |
|---|---|---|
| WO | WO 80/01157 A1 | 6/1980 |
| WO | WO 96/11147 A1 | 4/1996 |

* cited by examiner

ADHESIVE LABEL RESEALABLE PACKAGE AND LABEL WEB

The present invention relates to an adhesive label according to the preamble of claim 1 and a package comprising such a label. The invention further concerns a label web of such labels.

BACKGROUND ART

Resealable packages are used in a number of fields. The packages may be designed in many different ways and may be either flexible or rigid. A very common solution to the problem of resealing the package is to provide a flap in the package wall whose delimitation corresponds to the desired opening. The delimitation consists of an indication, which may be an area of locally thinner material, a perforation or a through slit. The flap is then covered by an adhesive label which covers the whole flap and the indication. The indication, combined with the self-adhesive label, gives the package a controlled opening geometry and an opening that can be easily resealed by means of the label.

To guarantee the consumer that the package has not been opened, the label may be supplemented by a guarantee seal, usually in the form of a sticker, which is broken like a seal when the package is opened for the first time.

A typical flap and guarantee seal are disclosed in U.S. Pat. No. 4,874,096. The package is a 'flow-pack' and has an arcuate indication which defines the flap. The entire surface of the flap is covered by a resealable label. Further examples of documents describing this type of packages and labels are SE 463,666, EP 0,396,976, DE 4,241,423 and WO80/01157.

A common feature of the prior-art resealing labels mentioned above is that they cover the whole flap, which means, thus, that they are preferably rectangular, regardless of the shape of the indication. The rectangular shape is advantageous from the point of view of manufacture, since the labels are picked from a carrier in the form of a continuous, silicone-treated web and applied to the packages. On a continuous carrier, the gripping surface of the label is suitably oriented so that it faces the periphery of the carrier and thus follows the direction of feed of the carrier. This orientation allows 'adhesive killing', i e the operation used to make the gripping surface non-sticking, to be carried out while continuously feeding the carrier. A further advantage of the rectangular shape is that the amount of waste material is relatively small, since the entire width of the carrier can be used to form the label.

WO96/11147 discloses a package which is provided with an essentially V-shaped or arcuate slit in the packaging material. A label covers the slit and is releasably attached to the package on both sides of the slit to seal the package in a resealable manner. The label has two side edges, which extend on either side of the slit following generally the direction of the slit. The label has a gripping tab, which is not adhesively fixed to the package thereby enabling the user to grip it when opening the package. WO96/11147 further describes how such labels can be produced without any waste of material, the labels having a shape which allows them to bear directly against each other on a carrier in a label web. This prior-art solution may be efficient from the point of view of material utilization, but it is not optimal.

OBJECTS OF THE PRESENT INVENTION

One object of the present invention is to provide a label which, with unaltered function, affords a maximum of material economy and thus implies a very low unit price.

One particular object is to provide a label and a package comprising such a label which allow an efficient material utilization and a satisfactory indication of whether the package has been opened or not.

Another object of the invention is to provide a label that can be used for any type of package.

A further object of the invention is to provide a label that is integratable into existing productive equipment.

SUMMARY OF THE INVENTION

The objects stated above are achieved by means of a label, a package and a label carrier as defined by the independent claims, preferred embodiments being apparent from the dependent claims.

Thus, according to the invention an adhesive label is provided which is intended for a resealable package of the kind which in its package body has an openable flap defined by an arcuate indication, which label when applied is adhesively fixed to the package body over the indication for the purpose of resealably sealing the package and which has a top portion located on the convex side of the indication and forming a gripping tab for opening the package, and two leg portions extending in a diverging manner from the gripping tab of the label each towards one end of the label and defining between them a central recess on the concave side of the indication. The label according to the invention is characterised in that it further comprises, as integral parts thereof, at least one indicator portion for each leg portion, which indicator portions have the form of portions projecting from the respective leg portions on the convex side of the indication and are adapted to be separated from the label as a result of the package being opened for the first time, and that said leg portions with the projecting indicator portions together form a first contour on the convex side of the indication and that the leg portions together form a second contour on the concave side of the indication, which is complementary to the first contour.

Further, a resealable package comprising such a label is provided.

A label web is also provided comprising a carrier which carries a succession of such labels, the labels being arranged relative to each other in such manner that said first contour of each label is fitted in said second contour of an adjoining label and partially enclosed by the central recess of the adjoining label.

The invention allows a more efficient and material-saving manufacture of resealable packages having integrated means for indicating any prior opening of the package.

The special design of the label contours on both sides of the arcuate indication in the package body allows the labels to be arranged very closely together on a carrier, each label being provided with integrated indicator portions.

When manufacturing the labels on a carrier, their contours may be in direct contact with one another on the carrier, or there may be a small interspace between adjoining labels on the carrier.

The shape of the label does not in any way influence the application or manufacturing method, which means that the label can be fully integrated into existing productive equipment.

The projecting indicator portions are adapted to remain on the package body when the package is opened for the first time, and are then separated from the rest of the label. Preferably, this can be achieved by the indicator portions being integrated with the rest of the label by means of perforations.

In certain embodiments of the invention, a portion of the label is permanently attached to the package body. This may be advantageous, for example, in cases where it is absolutely necessary for the guarantee seal to break when the package is opened for the first time. The permanent attachment may be achieved, for example, by means of local welding or any other permanent fixing of a portion of the label to the package wall. A permanent, local fixing of the label can also be used to ensure that the whole label is not pulled off during opening, or to make sure that the opening procedure is controlled, i.e. a physical tearing stop. Naturally, the fixing does not need to be permanent, but may be effected by means of locally stronger adhesion.

DESCRIPTION OF PREFERRED EMBODIMENTS

For exemplifying purposes, the invention will be described in more detail below with reference to the accompanying drawings, which illustrate preferred embodiments.

FIG. 1 illustrates a package provided with a label according to prior art.

FIG. 2*a* illustrates a package provided with a label according to a first embodiment of the invention.

FIG. 2*b* is a cross-sectional view along the line A—A in FIG. 2*a*.

Figure 5A:
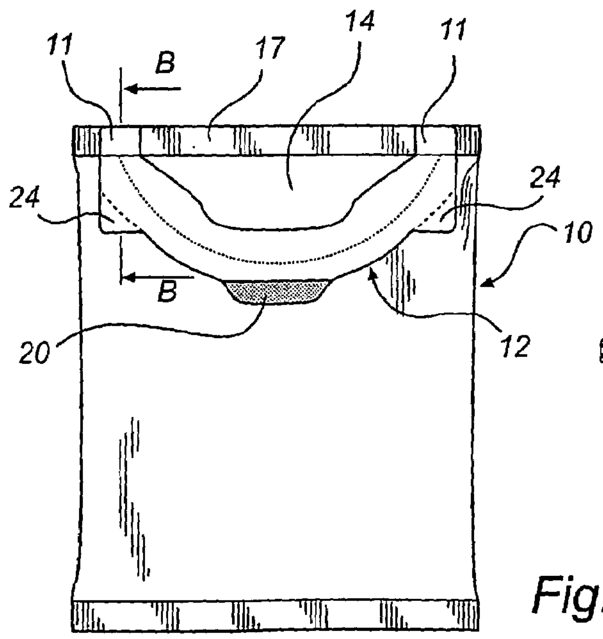
FIG. 5A illustrates a package with a variant of the label according to FIG. 3, the label being permanently attached to the package.
Figure 5B:
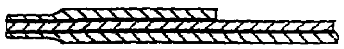

FIG. 5*b* is a cross-sectional view along the line B—B in FIG. 5*a*.

Figure 6A:
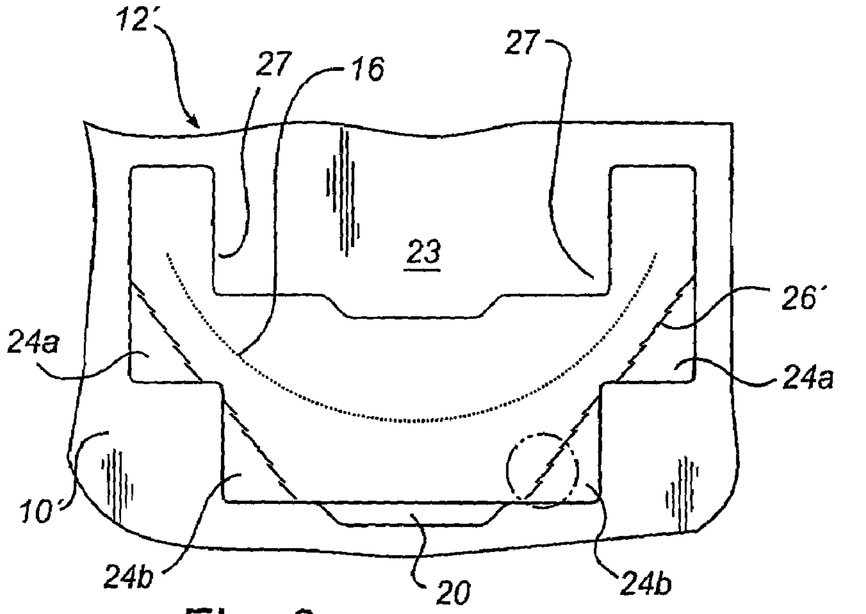

FIG. 6*a* illustrates a label according to a second embodiment of the invention.

Figure 6B:
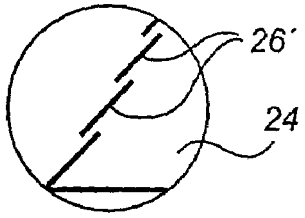

FIG. 6*b* is a partial enlargement of the label according to FIG. 6*a*.

Figure 7:
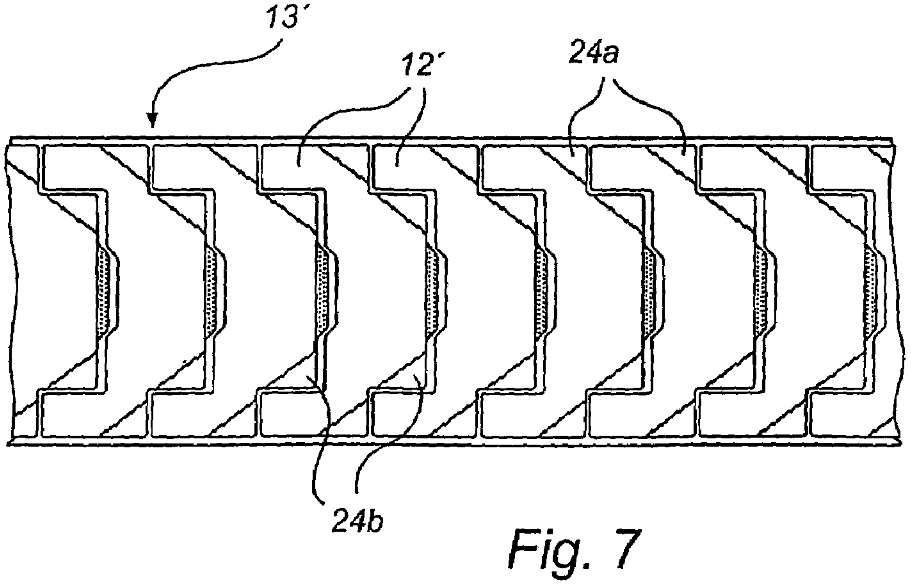

FIG. 7 is a plan view of a label web, comprising labels according to FIG. 6*a*.

For improved understanding of the invention, a prior-art resealable package comprising a flap which is resealable by means of a label according to prior art is described by way of introduction. However, the invention is in no way limited to flexible packages of the type described, but can also be applied, for example, to rigid packages made of cardboard or other materials.

Figure 1:
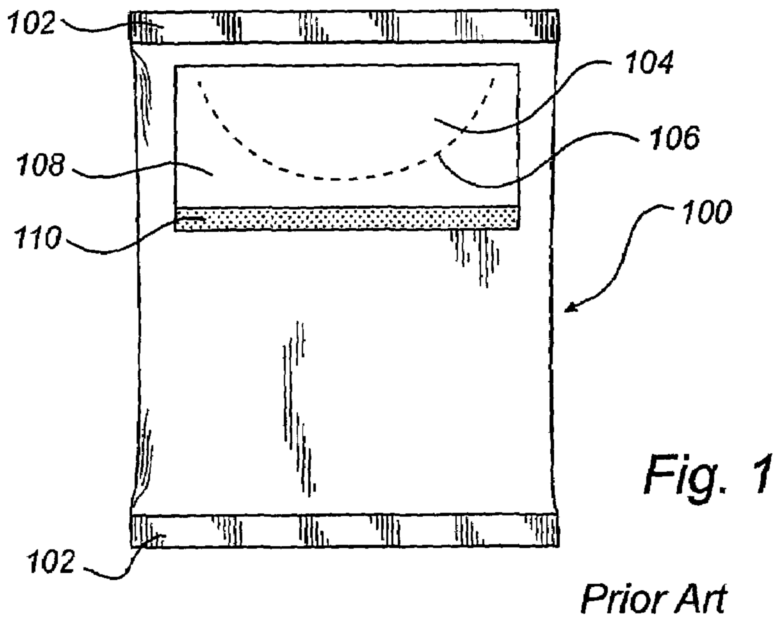
Fig. 1 Prior Art

FIG. 1 shows a prior-art package 100 of the kind often used, for example, for packaging candy. The package is also called a 'flow-pack' and is made (not shown) by wrapping a continuous web of packing material about its longitudinal axis and then joining the longitudinal edges of the web so that they form a joint extending along the longitudinal axis of the web. The web of material thus joined is then partitioned off to form a pocket by means of a transverse joint 102 forming the bottom thereof. The pocket is then filled and closed by means of a second transverse joint 102 forming the top thereof, before the finished package can be separated.

An openable flap 104 is formed by punching an indication 106 in the web of material while this is still in a flat, non-wrapped condition. The indication 106 may be a continuous through slit, a perforation or an indentation. The form of the indication 106 will be dependent on, for example, the design and size of the flap 104, the step of the manufacturing process in which the indication is formed as well as the packing material. For instance, if the indication 106 is formed in a web of material that is to be rewound onto a roll in order to be formed into the final package at a later stage, it may be advantageous not to have a through slit, since the tension in the web may lead to rupturing of the indication or involuntary opening of the flap.

It is most preferred for the indication 106 to be formed and covered by the label 101 immediately before the web of material is formed into a finished package 100, but the indication and the label may be provided also at an earlier stage of the process.

FIG. 1 shows a label 108 of a known, traditional type. The label 108 is rectangular and made of a self-adhesive material and comprises a gripping surface 110 provided along one edge. The gripping surface 110 is adhesive-free and forms a gripping tab intended for the user. The size of the rectangular label 108 is such that it covers at least the whole flap 104.

The relevant parts of the manufacturing technique and the material selection described above are applicable to the implementation of the present invention.

In the following, a preferred embodiment of a label according to the invention as well as a package and a label web according to the invention will be described.

Figure 2A:
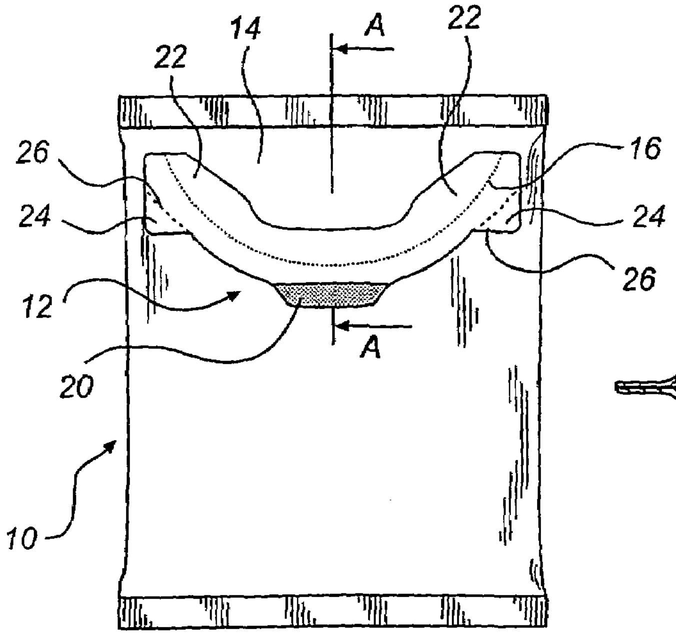
Figure 3:
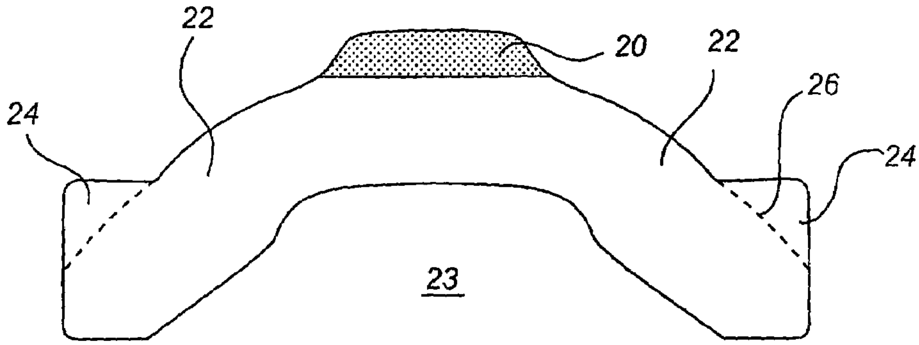
FIG. 3 illustrates the label in FIG. 2*a*.
Figure 4:
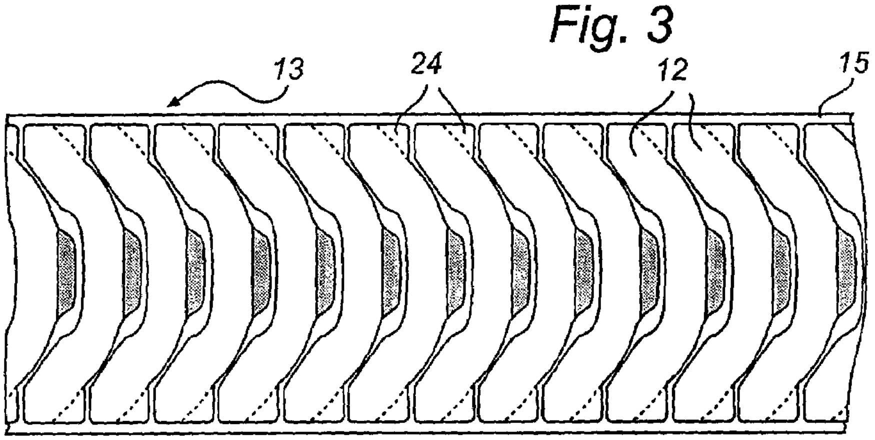
FIG. 4 is a plan view of part of a label web, comprising labels according to FIG. 3.

FIG. 2*a* shows a package 10 provided with a first embodiment of a label 12 according to the invention. FIG. 3 shows the label 12 exposed and FIG. 4 shows a label web 13 comprising a plurality of such labels 12 applied onto a carrier 15 during the manufacture of such packages.

The package 10 may be of the same type as in FIG. 1 and has an arcuate indication 16, for example in the form of an arcuate perforation in the package body. The arcuate perforation defines an openable flap 14. When applied, the label 12 covers the perforation 16. The label 12 is adhesively fixed to the package body on both sides of the perforation 16 in per se known manner. To open the package the user grips an adhesive-free gripping tab 20 of the label (realised, for example, by means of "adhesive killing" of the corresponding surface) and lifts it, and thus the openable flap 14, thereby exposing an opening to the inside of the package. The label 12 is resealably adhered to the package body, so that the package can be opened and resealed repeatedly.

The shape of the label is such that it extends on both sides of the perforation 16, thus forming two diverging leg portions 22, which between them define a central recess 23 on the side of the label 12 located on the concave side of the indication 16.

In the embodiment shown in FIG. 3, each leg portion 22 has only one projecting indicator portion 24 at the end thereof. The purpose of the indicator portions 24 is to serve as a visual indication allowing the user to determine whether the package has already been opened.

Figure 2B:
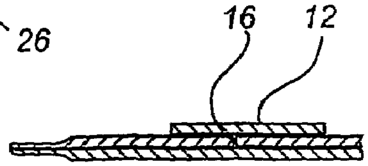

Each projecting indicator portion 24 is integrated with the label 12, i e is made in one piece with the label, and projects from the label away from the convex side of the arcuate perforation 16. In the embodiment shown in FIGS. 2–4, the indicator portions 24 are essentially triangular, but may also be given a more rounded shape.

The indicator portions 24 are connected to the leg portions 22 of the label by means of perforations 26. The perforations may be formed by notches or punched slits. These may be aligned as shown in FIG. 3 or, which may be preferred, they may be slightly displaced sideways and overlapping so as to form a stepped shape, as will be described below with reference to a second embodiment of the label according to the invention (see FIG. 6*b*).

The size of the label 12 should be such that it covers a required area around the arcuate indication 16 to ensure adequate and secure adhesion to the flap 14 and sealing of the package.

When a package 10 provided with such a label 16 is opened for the first time, the label 16 will rupture along the perforations 26 of the indicator portions 24, which will remain adhered to the package body. This will cause a relatively rough, burred surface to appear, clearly indicating to the user that the package has been opened.

To facilitate the rupturing of the label 12 along its perforations 26, each perforation may be located in a locally adhesive-free zone around the perforation, as described in SE-C2-505 294. The adhesive-free zones have a limited width to prevent them from having a detrimental effect on the sealing function. Said document is incorporated herewith by reference. A zone of this kind further enhances the indication that the package has been opened. In particular, it will not be possible to conceal the fact that the package has been opened by depressing the edges along the ruptured perforation 26.

The label 16 is self-adhesive and adheres to the package 10, but in some situations it may be preferable for certain portions of the label to be permanently attached to the package. For example, such a portion may be a portion 11 of the label 10 that is welded onto one of the regular welding joints 17 of the package, as shown in FIG. 5*a* and FIG. 5*b*, in which the reference numerals are the same as those used in FIGS. 2*a* and 2*b*. Another example of a permanently attached portion is the indicator portions 24. A local, permanent attachment reinforces the effect of the guarantee seal. An equivalent effect may be achieved if the adhesive strength is increased locally in the relevant area. Another local area in which increased adhesion may be desirable is the area of the label 12 overlapping the openable flap 14.

FIG. 4 shows a label web 13 comprising a carrier 15 which carries a number of labels 12 according to FIG. 3. The labels 12 may be made of any arbitrary, flexible material. The rear surface of the labels is provided with an adhesive the quality of which is such that it will adhere to the surface and the material quality used in the package for which the label is intended. The labels 12 are punched into the desired shape and supplied on the continuous, preferably silicone-treated, carrier 15.

The labels 12 do not necessarily have to be applied on a silicone-treated carrier. If "linerless" or carrier-free labels are used, the labels are punched directly from a self-adhesive strip in connection with the application.

A label according to the invention is characterised in that its leg portions 22 and the associated indicator portions 24 together form a first contour on the convex side of the indication 16, while the leg portions 22 together form an complementary second contour on the concave side of the indication 16. Complementary here means that such labels may be "recessed" in each other prior to being applied onto the package, the recess 23 of one label partly enclosing the adjoining label. In particular, the second contour is designed to be complementary to the projecting indicator portions 24 forming the first contour. Thus, the shape of the second contour is dependent on the number of indicator portions as well as the position and shape thereof.

Consequently, the labels 12 in FIG. 4 are fitted into each other. In the label web 13 shown in FIG. 4, an interspace is provided between each label 12, which facilitates the positioning of the carrier and the label. However, the interspace is not indispensable, and if it is eliminated the amount of waste material will be further reduced. Thus, the labels 12 and the perforations 26 thereon may, for example, be punched directly from a label blank which is applied initially onto the carrier 15.

FIGS. 6*a*, 6*b* and 7 show a second embodiment of a label 12' and a label web 13' according to the invention. In this embodiment, each leg portion 22 of the label 22' is provided with two indicator portions 24*a* and 24*b*, respectively, which are of the same kind as in the first embodiment and which are integrated with the leg portions 22 by means of perforations 26'. Reference numeral 10' in FIG. 6*a* designates a broken-away part of the package body.

Due to the supplementary indicator portions 24*b*, this second embodiment affords increased protection against any unauthorized opening of the package. Furthermore, the label according to this second embodiment, in accordance with the invention, has a second contour on the concave side of the indication 16, which is complementary to the first contour on the convex side of the indication 16. Thus, the label 12' has two recesses 27, which are complementary to the indicator portions 24*b* and which allows the label 12' to be tightly packed on the carrier 15' of the labels web 13', as shown in FIG. 7. In this embodiment, the first and the second contour of the label 12' have an essentially stepped shape. However, the contours may also be more rounded so as to have a waved shape.

In the enlarged portion shown in FIG. 6*b*, the perforations 26' in this second embodiment are in the form of mutually overlapping and displaced notches or slits. This perforation design may be advantageous in order to ensure that the whole perforation ruptures when the label is opened for the first time and that the label is not torn in any other direction. Generally, this type of perforation can be used for all the embodiments of the invention.

Labels according to the present invention can be used in both flexible and rigid packages. In the case where they are used in rigid packages, the flap should be provided with one or more creases to give it the required flexibility.

The central recess 23, in combination with the complementary contours of the label, allows considerable savings in terms of material and costs, since the labels can be arranged on a carrier in such manner that each label in a succession of identical labels is partially enclosed in the central recess 23 of an adjoining label while at the same time the labels are provided with integrated indicator portions.

What is claimed is:

1. An adhesive label intended for a resealable package of the kind which in its package body has an openable flap defined by an arcuate indication, which label, when applied, is adhesively fixed to the package body over the indication for the purpose of resealably sealing the package and which has a top portion located on the convex side of the indication and forming a gripping tab intended for opening the package, and two leg portions extending in a diverging manner from the gripping tab of the label each towards one end of the label and defining between them a central recess on the concave side of the indication, wherein:

the label further comprises, as integral parts thereof, a first indicator portion at the end of each leg portion, which first indicator portions have the form of portions projecting from the respective leg portions on the convex side of the indication and are adapted to be separated from the label as a result of the package being opened for the first time, and said leg portions with the projecting first indicator portions together form a first contour on the convex side of the indication and that the leg portions together form a second contour on the concave side of the indication, which is complementary to the first contour, wherein the second contour is complementary to the first contour such that when the central recess of a second label partly encloses a first label that indicator portions of the first label are positioned within imaginary extensions of the legs of the second label, and wherein each first indicator portion is integrated with the corresponding leg portion by means of a perforation.

2. The label according to claim 1, wherein the perforations of the first indicator portions are arranged in adhesive-free zones of the label.

3. The label according to claim 1, wherein each leg portion comprises at least two projecting indicator portions, a first one of which is arranged at the end of the leg portion and a second one of which is arranged between the first indicator portion and the gripping tab.

4. The label according to claim 3, wherein said first contour and said second, complementary contour have an essentially stepped shape.

5. The label according to claim 3, wherein said first contour and said second, complementary contour have an essentially waved shape.

6. A label web, comprising a carrier which carries a succession of labels as claimed in claim 1, said labels being arranged relative to each other in such manner that said first contour of each label is fitted in said second contour of an adjoining label and partially enclosed by the central recess of the adjoining label.

7. A resealable package, comprising a package body which has an openable flap defined by an arcuate indication, and a label which is adhesively fixed to the package body over the indication for the purpose of resealably sealing the package and which has a top portion located on the convex side of the indication and forming a gripping tab intended for opening the package, and two leg portions extending in a diverging manner from the gripping tab of the label each towards one end of the label and defining between them a central recess on the concave side of the indication, wherein:

the label further comprises, as integral parts thereof, at least one indicator portion for each leg portion, which indicator portions have the form of portions projecting from the respective leg portions on the convex side of the indication and are adapted to be separated from the label as a result of the package being opened for the first time, and said leg portions with the projecting indicator portions together form a first contour on the convex side of the indication and that the leg portions together form a second contour on the concave side of the indication, which is complementary to the first contour, wherein the second contour is complementary to the first contour such that when the central recess of a second label partly encloses a first label the indicator portions of the first label are positioned within imaginary extensions of the legs of the second label, and wherein each first indicator portion is connected to the corresponding leg portion by means of a perforation.

8. The package according to claim 7 wherein the perforations of the first indicator portions are arranged in adhesive-free zones of the label.

9. The package according to claim 7, wherein each leg portion comprises at least two projecting indicator portions, a first one of which is arranged at the end of the leg portion and a second one of which is arranged between the first indicator portion and the gripping tab.

10. The package according to claim 9, wherein said first contour and said second, complementary contour have an essentially stepped shape.

11. The package according to claim 9, wherein said first contour and said second, complementary contour have an essentially waved shape.

* * * * *